(12) United States Patent
Wei et al.

(10) Patent No.: US 9,065,663 B2
(45) Date of Patent: Jun. 23, 2015

(54) METHOD, APPARATUS AND SYSTEM FOR FORWARDING MULTICAST PROGRAM

(71) Applicant: HUAWEI TECHNOLOGIES CO., LTD., Shenzhen (CN)

(72) Inventors: Ming Wei, Shenzhen (CN); Bin Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 14/165,978

(22) Filed: Jan. 28, 2014

(65) Prior Publication Data

US 2014/0140700 A1    May 22, 2014

Related U.S. Application Data

(63) Continuation of application No. PCT/CN2011/077817, filed on Jul. 29, 2011.

(51) Int. Cl.
| | |
|---|---|
| *H04J 14/08* | (2006.01) |
| *H04L 12/18* | (2006.01) |
| *H04B 10/27* | (2013.01) |
| *H04B 10/00* | (2013.01) |
| *H04L 12/801* | (2013.01) |

(52) U.S. Cl.
CPC ............. *H04L 12/18* (2013.01); *H04L 12/185* (2013.01); *H04B 10/27* (2013.01); *H04L 47/15* (2013.01)

(58) Field of Classification Search
CPC .............. H04B 10/27; H04J 2203/008; H04Q 11/0067; H04Q 11/0071
See application file for complete search history.

(56) References Cited

U.S. PATENT DOCUMENTS

| 7,281,058 B1 | 10/2007 | Shephard et al. |
| 2005/0135365 A1 | 6/2005 | Sung et al. |

(Continued)

FOREIGN PATENT DOCUMENTS

| CN | 1855834 | 11/2006 |
| CN | 1953367 | 4/2007 |

(Continued)

OTHER PUBLICATIONS

Chinese Office Action dated Jul. 1, 2013 in corresponding Chinese Patent Application No. 201180001387.7.

(Continued)

*Primary Examiner* — Daniel Dobson
(74) *Attorney, Agent, or Firm* — Staas & Halsey LLP

(57) ABSTRACT

The present invention provide a method for forwarding a multicast program includes: receiving a multicast join request message requesting an on-demand program from a user; obtaining forwarding decision information according to the multicast join request message; determining a decision result corresponding to the forwarding decision information according to the forwarding decision information and forwarding relation data, where the decision result is forwarding according to PON replication or forwarding according to user replication, the forwarding relation data includes data elements indicating correspondence between various types of forwarding decision information and various types of forwarding modes, and the various types of forwarding modes include the forwarding according to PON replication and the forwarding according to user replication; and forwarding the on-demand program to the user according to the decision result.

12 Claims, 7 Drawing Sheets

(56) References Cited

U.S. PATENT DOCUMENTS

| | | | |
|---|---|---|---|
| 2007/0025352 A1 | 2/2007 | Tanaka et al. | |
| 2007/0217414 A1 | 9/2007 | Berkman et al. | |
| 2008/0304825 A1* | 12/2008 | Mahony et al. | 398/38 |
| 2009/0161670 A1 | 6/2009 | Shepherd et al. | |
| 2009/0201803 A1 | 8/2009 | Filsfils et al. | |
| 2011/0249970 A1* | 10/2011 | Eddleston et al. | 398/58 |

FOREIGN PATENT DOCUMENTS

| | | |
|---|---|---|
| CN | 101009620 | 8/2007 |
| CN | 101056191 | 10/2007 |
| CN | 101068129 | 11/2007 |
| CN | 101083546 | 12/2007 |
| CN | 101094087 | 12/2007 |
| CN | 101162947 | 4/2008 |
| CN | 101174909 | 5/2008 |
| CN | 101202591 | 6/2008 |
| CN | 101808256 | 8/2010 |
| EP | 2091187 | 8/2009 |

OTHER PUBLICATIONS

PCT International Search Report and Written Opinion of the International Searching Authority dated May 3, 2012 in corresponding International Patent Application No. PCT/CN2011/077817.

International Search Report mailed May 3, 2012, in corresponding International Application No. PCT/CN2011/077817.

Extended European Search Report issued on Jun. 30, 2014 in corresponding European Patent Application No. 11 859 010.8.

* cited by examiner

METHOD, APPARATUS AND SYSTEM FOR FORWARDING MULTICAST PROGRAM

CROSS-REFERENCE TO RELATED APPLICATIONS

This application is a continuation of International Application No. PCT/CN2011/077817, filed on Jul. 29, 2011, which is hereby incorporated by reference in its entirety.

TECHNICAL FIELD

The present invention relates to the field of communications technologies, and in particular, to a method, an apparatus and a system for forwarding a multicast program.

BACKGROUND

A multicast service in an access device is an important and widely used service, and a PON (Passive Optical Network, passive optical network) system belongs to a broadcasting system, so it is more advantageous to perform the multicast service over the PON.

There are two method for forwarding an OLT (Optical Line Terminal, optical line terminal) multicast program in the prior art; one is a mode of forwarding according to PON replication, while the other one is a mode of forwarding according to user replication. However, according to the solutions of the prior art, the OLT may forward the multicast program only in the mode of forwarding according to PON replication, or forward the multicast program only in the mode of forwarding according to user replication, so it is unable to support the two forwarding modes according to the actual needs of the user at the same time.

SUMMARY

Embodiments of the present invention provide a method, an apparatus and a system for forwarding a multicast program, in order to improve flexibility of forwarding a multicast program.

A method for forwarding a multicast program includes:
receiving a multicast join request message from a user for requesting an on-demand program;
obtaining forwarding decision information according to the multicast join request message;
determining a decision result corresponding to the forwarding decision information according to the forwarding decision information and forwarding relation data, where the decision result is forwarding according to PON replication or forwarding according to user replication, the forwarding relation data includes data elements indicating correspondence between various types of forwarding decision information and various types of forwarding modes, and the various types of forwarding modes include the forwarding according to PON replication and the forwarding according to user replication; and
forwarding the on-demand program to the user according to the decision result.

An apparatus for forwarding a multicast program includes:
a receiving unit, configured to receive a multicast join request message from a user for requesting an on-demand program;
an information acquiring unit, configured to obtain forwarding decision information according to the multicast join request message;
a determining unit, configured to determine a decision result corresponding to the forwarding decision information according to the forwarding decision information and forwarding relation data, where the decision result is forwarding according to PON replication or forwarding according to user replication, the forwarding relation data includes data elements indicating correspondence between various types of forwarding decision information and various types of forwarding modes, and the various types of forwarding modes include the forwarding according to PON replication and the forwarding according to user replication; and
a forwarding unit, configured to forward the on-demand program to the user according to the decision result.

A system for forwarding a multicast program includes: an optical network terminal and an optical line terminal, where
the optical network terminal sends a multicast join request message requesting an on-demand program from a user to the optical line terminal; and
the optical line terminal receives the multicast join request message, obtains forwarding decision information according to the multicast join request message, determines a decision result corresponding to the forwarding decision information according to the forwarding decision information and forwarding relation data, where the decision result is forwarding according to PON replication or forwarding according to user replication, the forwarding relation data includes data elements indicating correspondence between various types of forwarding decision information and various types of forwarding modes, and the various types of forwarding modes include the forwarding according to PON replication and the forwarding according to user replication, and forwards the on-demand program to the optical network terminal according to the decision result.

It can be seen from the embodiments of the present invention that, the forwarding relation data includes the data elements indicating the correspondence between the various types of forwarding decision information and the various types of forwarding modes, and the various types of forwarding modes include the forwarding according to PON replication and the forwarding according to user replication. Therefore, for the users with different forwarding requirements, the embodiments of the present invention may select the corresponding forwarding modes flexibly according to different multicast programs. In this manner, by using the method, apparatus and system for forwarding the multicast program according to the embodiments of the present invention, the flexibility of forwarding the multicast programs is improved.

BRIEF DESCRIPTION OF DRAWING

To illustrate the technical solutions according to the embodiments of the present invention more clearly, the accompanying drawings required for describing the embodiments are introduced below briefly. Apparently, the accompanying drawings in the following descriptions merely show some of the embodiments of the present invention, and persons of ordinary skill in the art can obtain other drawings according to the accompanying drawings without creative efforts.

DESCRIPTION OF EMBODIMENTS

The technical solutions of the present invention are clearly and fully described in the following with reference to the accompanying drawings of the embodiments of the present invention. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
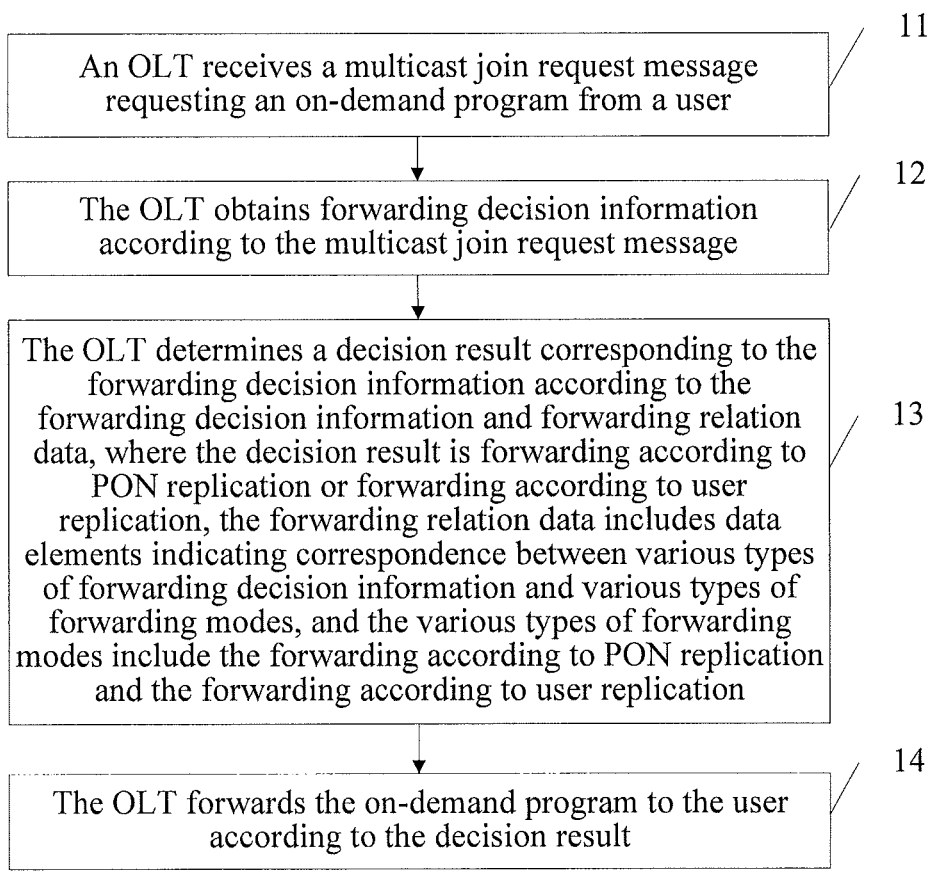
FIG. 1 is a flowchart of a method for forwarding a multicast program according to Embodiment 1 of the present invention.

As shown in FIG. 1, a method for forwarding a multicast program according to Embodiment 1 of the present invention includes the following steps.

Step 11: An OLT receives a multicast join request message requesting an on-demand program from a user.

Specifically, the user may send the multicast join request message to the OLT through an optical network terminal (Optical Network Terminal, ONT) that the user belongs to. The multicast join request message may include information about the on-demand multicast program requested by the user, such as identification information and user type of the multicast program requested by the user. The user includes a terminal device.

Step 12: The OLT obtains forwarding decision information according to the multicast join request message.

Step 13: The OLT determines a decision result corresponding to the forwarding decision information according to the forwarding decision information and forwarding relation data, where the decision result is forwarding according to PON replication or forwarding according to user replication, the forwarding relation data includes data elements indicating the correspondence between various types of forwarding decision information and various types of forwarding modes, and the various types of forwarding modes include the forwarding according to PON replication and the forwarding according to user replication.

Furthermore, the forwarding relation data may include at least one data element indicating that the forwarding mode is the forwarding according to PON replication, and at least one data element indicating that the forwarding mode is the forwarding according to user replication.

Step 14: The OLT forwards the on-demand program to the user according to the decision result.

Specifically, in step 14, the OLT may establish forwarding table entries for the multicast program in a forwarding table according to the decision result, where the forwarding table entries include the multicast program and a forwarding port; and the forwarding port is a port for forwarding according to PON replication or a port for forwarding according to user replication.

The OLT acquires the multicast program, looks up the forwarding table, and forwards the multicast program to the user according to the forwarding table entries. The OLT may acquire the multicast program ordered by the user through a multicast program providing device, such as a server (Server).

The users may be classified into two types; one type of the users are users subscribing to a multicast service, while the other type of users are users only subscribing to basic services, such as network access, that is, users not subscribing to the multicast service. In addition, the multicast programs may also be classified into two types; one type of programs are multicast programs with a low security level, while the other type of programs are multicast programs with a high security level. A limit of distinguishing whether a multicast program is of a high security level or a low security level may be determined by the system itself. The programs with a security level higher than a preset security level may be classified at the high security level, while the programs with a security level lower than the preset security level may be classified at the low security level. For example, for some type of programs, if the users can watch these programs only after an extra payment according to needs, this type of programs may be classified as the programs with a high security level. For another example, for some type of programs, some encrypted contents are included therein, so this type of programs may also be classified as the programs with a high security level. The OLT may obtain, according to its own configuration, the user type of the user and the security level of the multicast program, after receiving the multicast join request message.

Therefore, the data elements indicating the correspondence between the various types of forwarding decision information and the various types of forwarding modes in step 13 may include: data elements indicating the correspondence between various user types and the various types of forwarding modes, for example, a data element indicating that the user type of not subscribing to a multicast service corresponds to the forwarding according to user replication, and a data element indicating that the user type of subscribing to the multicast service corresponds to the forwarding according to user replication.

Or, the data elements indicating the correspondence between the various types of forwarding decision information and the various types of forwarding modes may include: data elements indicating the correspondence between various security levels of on-demand programs and the various types of forwarding modes, for example, a data element indicating that the security level higher than a preset security level corresponds to the forwarding according to user replication, and a data element indicating that the security level lower than the preset security level corresponds to the forwarding according to PON, replication.

Or, the data elements indicating the correspondence between the various types of forwarding decision information and the various types of forwarding modes may include: data elements indicating the correspondence between various combinations of the various user types and the various security levels of on-demand programs and the various types of forwarding modes, for example, a data element indicating that the security level of the on-demand program higher than a preset security level and the user type being a user subscribing to a multicast service correspond to the forwarding according to user replication; a data element indicating that the security level of the on-demand program higher than the preset security level and the user type being a user not subscribing to the multicast service correspond to the forwarding according to user replication; a data element indicating that the security level of the on-demand program lower than the preset security level and the user type being a user not subscribing to the multicast service correspond to the forwarding according to user replication; and a data element indicating that the security level of the on-demand program lower than the preset security level and the user type being a user subscribing to the multicast service correspond to the forwarding according to PON replication.

Or, the data elements indicating the correspondence between the various types of forwarding decision information and the various types of forwarding modes may include: data elements indicating the correspondence between the number of a same type of users ordering a same program and the various types of forwarding modes, for example, a data element indicating that the number of the same type of users ordering the same program, which is smaller than or equal to a threshold, corresponds to the forwarding according to user replication; and a data element indicating that the number of the same type of users ordering the same program, which is greater than the threshold, corresponds to the forwarding according to PON replication. The threshold may be set arbitrarily, for example, set to 100.

The forwarding relation data includes the data elements indicating the correspondence between the various types of forwarding decision information and the various types of forwarding modes, and the various types of forwarding modes include the forwarding according to PON replication and the forwarding according to user replication. Therefore, for the users with different forwarding requirements, the embodiment of the present invention may select the corresponding forwarding modes flexibly according to different multicast programs, so the flexibility of forwarding the multicast programs is improved.

The following describes how to implement the forwarding of the multicast program ordered by the user in detail in combination with Embodiment 2 to Embodiment 4.

In the following embodiments, the first type of users indicate the users subscribing to the multicast service, where U1 belongs to the first type of users; while the second type of users indicate the users only subscribing to basic services, such as network access, where U2 belongs to the second type of users. P1 is used to indicate a multicast program with a low security level, while P2 is used to indicate a multicast program with a high security level. The number of the users included in the first type of users and the second type of users is not set specifically.

Figure 2:
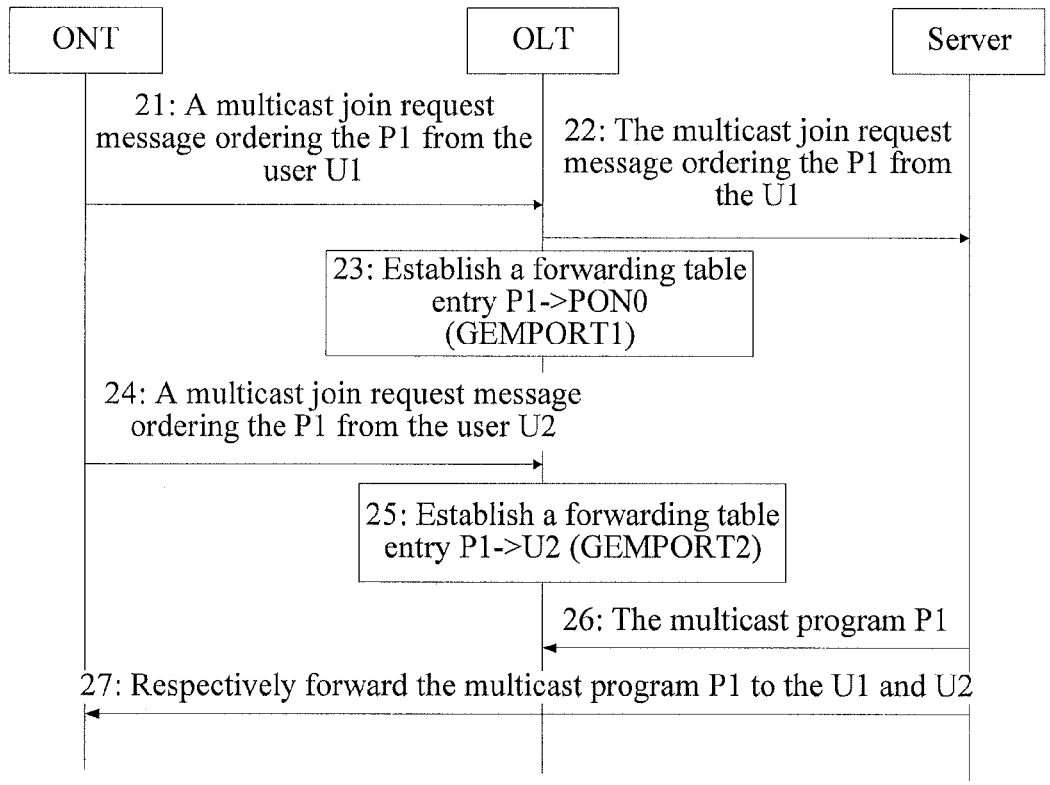
FIG. 2 is a flowchart of a method for forwarding a multicast program according to Embodiment 2 of the present invention.

In Embodiment 2, it is assumed that the two types of users U1 and U2 both order the multicast program P1. As shown in FIG. 2, a method for forwarding a multicast program according to Embodiment 2 of the present invention includes the following steps.

Step 21: The U1 sends a multicast join request (Igmp Request) message to an OLT through an ONT that the U1 belongs to, where the multicast join request message includes information about the multicast program P1 ordered by the U1, such as an identifier of the P1.

After receiving the multicast join request message from the U1, the OLT acquires the user type of the user U1 according to the multicast join request message. Forwarding relation data includes a forwarding relation data element indicating that the first type of users correspond to forwarding according to PON replication. According to the user type of the U1 and the forwarding relation data, it is determined that the forwarding mode of the multicast program P1 ordered by the U1 is the forwarding according to PON replication.

Step 22: The OLT forwards the multicast join request message to a multicast program providing device, such as a server.

Step 23: Establish the following forwarding table entry in a forwarding table according to the forwarding mode of the program P1 ordered by the U1 as determined in step 21:

P1→PON0 (GEMPORT1), which indicates that the program P1 ordered by the first type of the user is forwarded through the GEMPORT1 under the PON0, that is, the on-demand multicast program P1 is forwarded to the first type of the user through the GEMPORT1 under the PON0 in a mode of PON replication.

Step 24: The U2 sends a multicast join request message to the OLT through the ONT that the U2 belongs to, where the multicast join request message includes information about the multicast program P1 ordered by the U2, such as the identifier of the P1.

After receiving the multicast join request message from the U2, the OLT may acquire the user type of the U2 by looking up its own configuration according to the multicast join request message. The forwarding relation data includes a forwarding relation data element indicating that the second type of users correspond to forwarding according to user replication. According to the user type of the U2 and the forwarding relation data, it is determined that the forwarding mode of the program P1 ordered by the U2 is the forwarding according to user replication.

Step 25: Establish the following forwarding table entry in the forwarding table according to the forwarding mode determined in step 24:

P1→U2 (GEMPORT2), which indicates that the program P1 ordered by the second type of the user U2 is forwarded through the GEMPORT2 under the PON0, that is, the on-demand multicast program P1 is forwarded to the U2 through the GEMPORT2 under the PON0 in a mode of user replication.

In this case, the forwarding table entries stored in the OLT include:

P1→PON0 (GEMPORT1); and

P1→U2 (GEMPORT2).

Step 26: The server provides the multicast program P1 to the OLT.

Step 27: The OLT forwards the multicast program P1 to the U1 and the U2 according to the established forwarding table entries. For the U1, the P1 is forwarded to the U1 through the GEMPORT1 in the mode of PON replication, while for the U2, the P1 is forwarded to the U2 through the GEMPORT2 in the mode of user replication.

It should be noted that FIG. 2 shows a case that the first type of users and the second type of users belong to the same ONT; when the two types of users belong to different ONTs, the processing principles are the same. The difference lies in that each user sends the multicast join request message to the OLT through the respective ONT that the user belongs to, and the multicast programs received by the OLT are also forwarded to each user through the respective ONT that the user belongs to. The same is true in the following embodiment.

Figure 3:
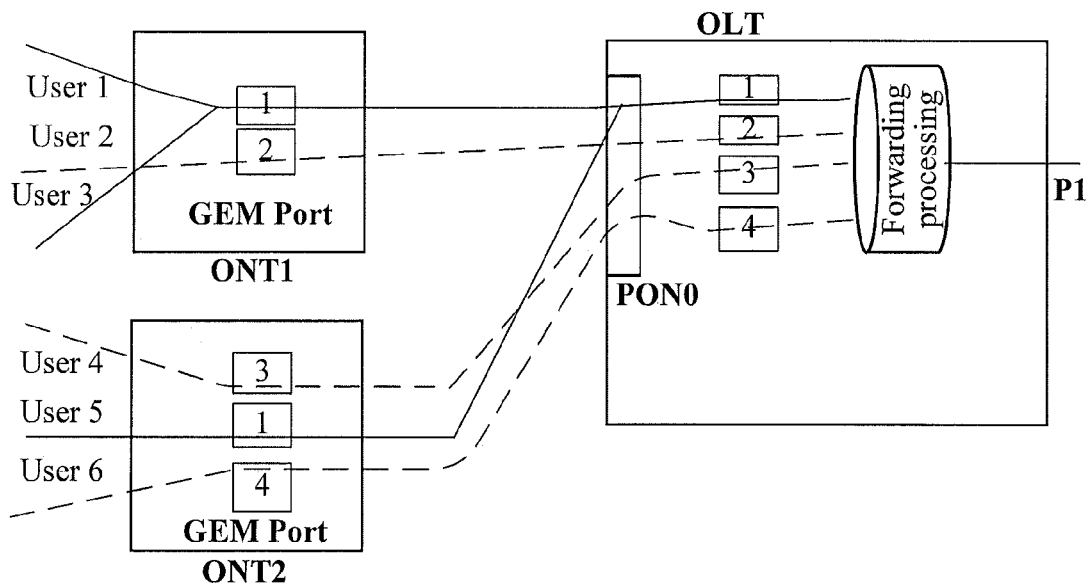
FIG. 3 is a schematic diagram of forwarding a multicast program according to Embodiment 2 of the present invention.

As shown in FIG. 3, it is a schematic diagram of forwarding a multicast program in this embodiment. Taking GPON as an example, the PON0 of the OLT is connected to two ONTs, where each ONT has three users. The users under the ONT1 are User 1, User 2 and User 3, while the users under the ONT2 are User 4, User 5 and User 6; and all the users order the program P1. The User 1, User 3 and User 5 belong to the first type of users, while the User 2, User 4 and User 6 belong to the second type of users. It can be seen from FIG. 3 that, for the User 1, User 3 and User 5, the forwarding modes are all determined as the forwarding according to PON replication (indicated by solid lines in the figure), and multicast program data is replicated on the GEMPORT1; while for the User 2, User 4 and User 6, the forwarding modes are all determined as the forwarding according to user replication (indicated by dotted lines in the figure), and the multicast program data is replicated on the GEMPORTs corresponding to the users, respectively. For example, for the User 2, the multicast program data is replicated on the corresponding GEMPORT2; for the User 4, the multicast program data is replicated on the corresponding GEMPORT3; and for the User 6, the multicast program data is replicated on the corresponding GEMPORT4.

In the method for forwarding the multicast program according to Embodiment 2 of the present invention, for the users with different forwarding requirements, the embodiment of the present invention may select corresponding forwarding modes flexibly. In addition, in this embodiment, for the second type of users, it is able to order the multicast program using bandwidth of basic services, such as network access, without the need to additionally apply for the multicast service, thereby improving user experience of the users.

Figure 4:
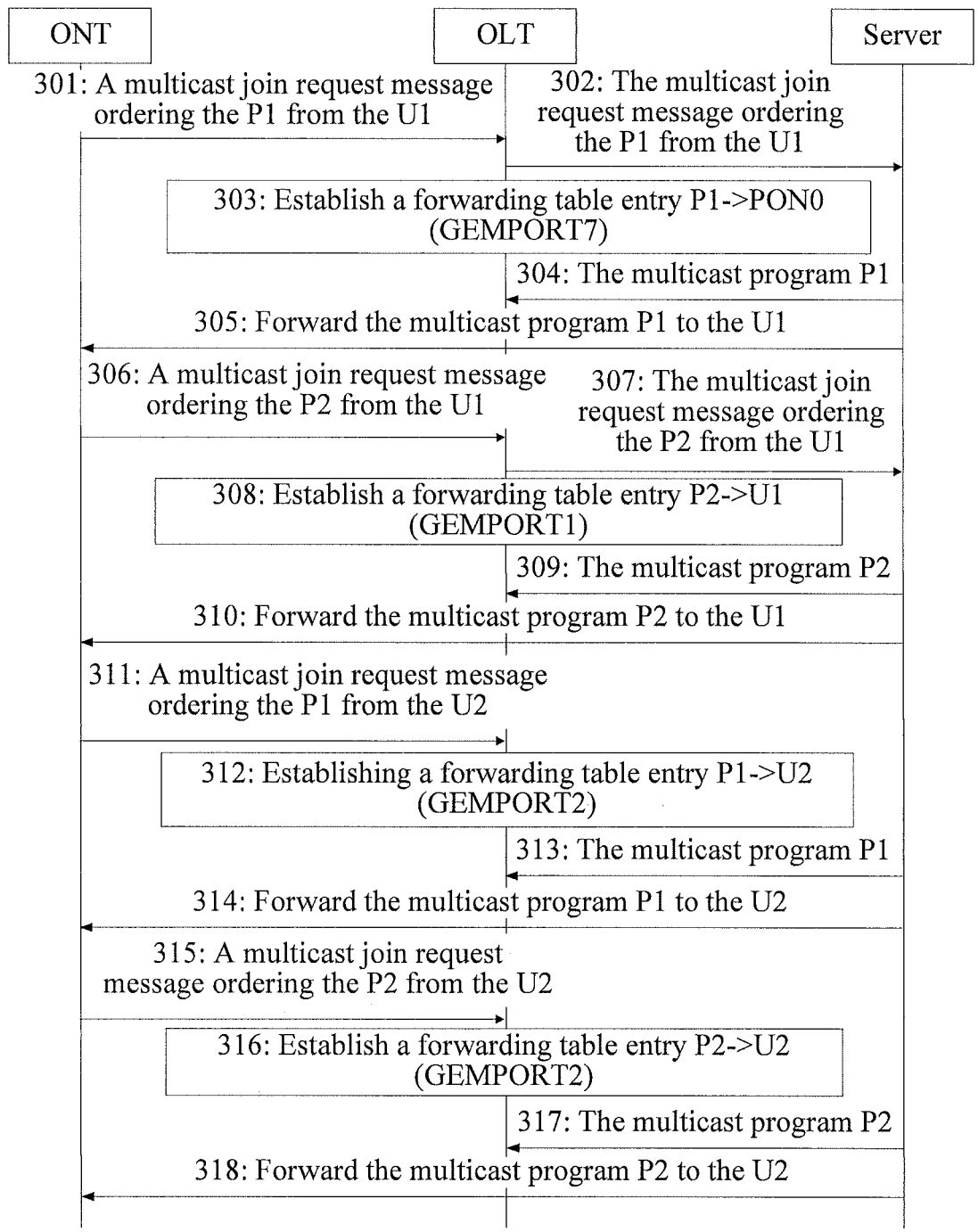
FIG. 4 is a flowchart of a method for forwarding a multicast program according to Embodiment 3 of the present invention.

In Embodiment 3, it is assumed that the two types of users U1 and U2 simultaneously order multicast programs P1 and P2. As shown in FIG. 4, a method for forwarding a multicast program according to Embodiment 3 of the present invention includes the following steps.

Step 301: The U1 sends a multicast join request message to an OLT through an ONT that the U1 belongs to, where the multicast join request message includes information about the multicast program P1 ordered by the U1, such as an identifier of the P1.

After receiving the multicast join request message from the U1, the OLT acquires user type information of the user U1 and security level information of the P1 according to the request message. Forwarding relation data includes a data element indicating that a combination of a first user type and a program with a low security level corresponds to forwarding according to PON replication; and according to this information and the forwarding relation data, it is determined that the forwarding mode of the multicast program P1 ordered by the U1 is the forwarding according to PON replication.

Step 302: The OLT forwards the multicast join request message to a multicast program providing device, such as a server.

Step 303: Establish the following forwarding table entry in a forwarding table according to the forwarding mode of the program P1 ordered by the U1 as determined in step 301:

P1→PON0 (GEMPORT7), which indicates that the program P1 ordered by the first type of the user U1 is forwarded through the GEMPORT7 under the PON0, that is, the on-demand multicast program P1 is forwarded to the first type of the user through the GEMPORT7 under the PON0 in a mode of PON replication.

Step 304: The server provides the multicast program P1 to the OLT.

Step 305: The OLT forwards the multicast program P1 to the first type of the user U1 according to the established forwarding table entry.

Step 306: The first type of the user U1 sends a multicast join request message to the OLT through the ONT, where the multicast join request message includes information about the multicast program P2 ordered by the U1, such as an identifier of the P2.

After receiving the multicast join request message ordering the P2 from the U1, the OLT acquires the user type information of the U1 and the security level information of the P2. The forwarding relation data includes a data element indicating that a combination of the first user type and a user with a high security level corresponds to the forwarding according to user replication; and according to this information and the forwarding relation data, it is determined that the forwarding mode of the multicast program P2 ordered by the U1 is the forwarding according to user replication.

Step 307: The OLT forwards the multicast join request message to the server.

Step 308: Establish the following forwarding table entry according to the forwarding mode determined in step 306:

P2→U1 (GEMPORT1), which indicates that the program P2 ordered by the U1 is forwarded through the GEMPORT1 under the PON0, that is, the on-demand multicast program P2 is forwarded to the U1 through the GEMPORT1 under the PON0 in a mode of user replication.

In this case, the forwarding table entries stored in the OLT include:

P1→PON0 (GEMPORT7); and
P2→U1 (GEMPORT1).

Step 309: The server provides the multicast program P2 to the OLT.

Step 310: The OLT forwards the multicast program P2 to the U1 according to the established forwarding table entries.

Step 311: The U2 sends a multicast join request message to the OLT through the ONT that the U2 belongs to, where the multicast join request message includes the information about the multicast program P1 ordered by the U2, such as the identifier of the P1.

After receiving the multicast join request message from the U2, the OLT acquires user type information of the user U2 and the security level information of the P1 according to the request message. The forwarding relation data includes a data element indicating that a combination of a second user type and a program with a low security level corresponds to the forwarding according to user replication; and according to this information and the forwarding relation data, it is determined that the forwarding mode of the multicast program P1 ordered by the U2 is the forwarding according to user replication.

Step 312: Establish the following forwarding table entry in the forwarding table according to the forwarding mode of the program P1 ordered by the U2 as determined in step 311:

P1→U2 (GEMPORT2), which indicates that the program P1 ordered by the user U2 is forwarded through the GEMPORT2 under the PON0, that is, the on-demand multicast program P1 is forwarded to the U2 through the GEMPORT2 under the PON0 in the mode of user replication.

In this case, the forwarding table entries stored in the OLT include:

P1→PON0 (GEMPORT7);
P2→U1 (GEMPORT1); and
P1→U2 (GEMPORT2).

Step 313: The server provides the multicast program P1 to the OLT.

Step 314: The OLT forwards the multicast program P1 to the U2 according to the established forwarding table entries.

Step 315: The second type of the user U2 sends a multicast join request message to the OLT through the ONT, where the multicast join request message includes the information about the multicast program P2 ordered by the U2, such as the identifier of the P2.

After receiving the multicast join request message from the U2, the OLT acquires the user type information of the user U2 and the security level information of the P2 according to the multicast join request message. The forwarding relation data includes a data element indicating that a combination of the second user type and the program with a high security level corresponds to the forwarding according to user replication; and according to this information and the forwarding relation data, it is determined that the forwarding mode of the multicast program P2 ordered by the U2 is the forwarding according to user replication.

Step 316: The OLT establishes the following forwarding table entry:

P2→U2 (GEMPORT2), which indicates that the program P2 ordered by the U2 is forwarded through the GEMPORT2 under the PON0, that is, the on-demand multicast program P2 is forwarded to the U2 through the GEMPORT2 under the PON0 in the mode of user replication.

In this case, the forwarding table entries stored in the OLT include:

P1→PON0 (GEMPORT7);
P2→U1 (GEMPORT1);
P1→U2 (GEMPORT2); and
P2→U2 (GEMPORT2).

Step 317: The server provides the multicast program P2 to the OLT.

Step 318: The OLT forwards the multicast program P2 to the U2 according to the established forwarding table entries.

Figure 5:
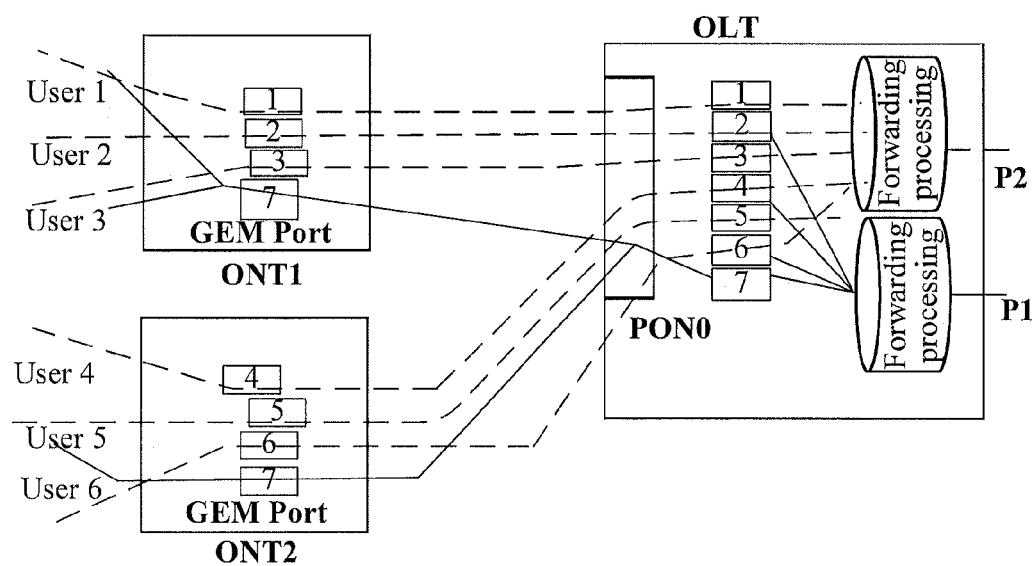
FIG. 5 is a schematic diagram of forwarding a multicast program according to Embodiment 3 of the present invention.

As shown in FIG. 5, it is a schematic diagram of forwarding a multicast program in this embodiment. Taking GPON as an example, the PON0 of the OLT is connected to two ONTs, where each ONT has three users. The users under the ONT1 are User 1, User 2 and User 3, while the users under the ONT2 are User 4, User 5 and User 6; and all the users order the programs P1 and P2. The User 1, User 3 and User 5 belong to the first type of users, while the User 2, User 4 and User 6 belong to the second type of users. It can be seen from FIG. 5 that, for the User 1, User 3 and User 5, when ordering the multicast program P1, the forwarding modes are all configured as the forwarding according to PON replication, and multicast program data is replicated on the GEMPORT7; and for the User 1, User 3 and User 5, when ordering the multicast program P2, the forwarding modes are all configured as the forwarding according to user replication, and the multicast program data is replicated on the GEMPORTs corresponding to the users, respectively. For example, for the User 1, the multicast program data is replicated on the corresponding GEMPORT1. While for the User 2, User 4 and User 6, when ordering the multicast programs P1 and P2, the forwarding modes are all configured as the forwarding according to user replication, and the multicast program data is replicated on the GEMPORTs corresponding to the users, respectively. For example, for the User 2, the multicast program data is replicated on the corresponding GEMPORT2; for the User 4, the multicast program data is replicated on the corresponding GEMPORT4; and for the User 6, the multicast program data is replicated on the corresponding GEMPORT6.

In this embodiment, for the users with different forwarding requirements and the multicast programs, the embodiment of the present invention may flexibly select the corresponding forwarding modes for the multicast programs ordered by the users. Therefore, by using the method for forwarding the multicast program according to the embodiment of the present invention, the flexibility of forwarding the multicast programs is improved. In addition, in this embodiment, the forwarding according to user replication is adopted for the programs with different security levels; in this way, it is ensured that other uses cannot acquire this type of programs, thereby improving security.

Figure 6:
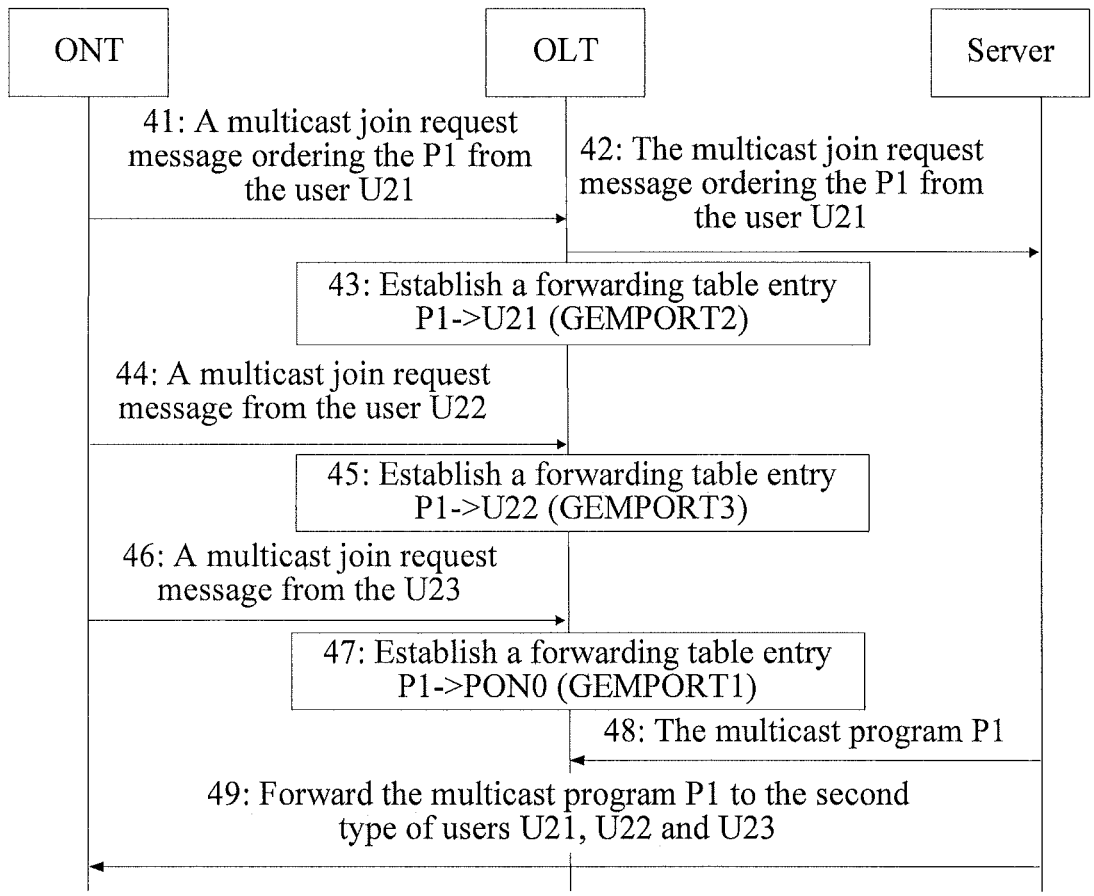
FIG. 6 is a flowchart of a method for forwarding a multicast program according to Embodiment 4 of the present invention.

In Embodiment 4, the second type of users order the multicast program P1, where five users in the second type of users order the P1, and a preset threshold is 2. The five users in the second type of users are U21 to U25. As shown in FIG. 6, a method for forwarding a multicast program according to Embodiment 4 of the present invention includes the following steps.

Step 41: A first user U21 in the second type of users sends a multicast join request message to an OLT through an ONT, where the multicast join request message includes information about the multicast program P1 ordered by the U21, such as an identifier of the P1.

After receiving the multicast join request message from the first user in the second type of users, the OLT acquires the number of the second type of users ordering the same program P1, where the number now is 1. Forwarding relation data includes a relation data element indicating that the number of the same type of users ordering the same program, which is smaller than or equal to a threshold, corresponds to forwarding according to user replication. According to the number and the forwarding relation data, it is determined that the multicast program ordered by the first user in the second type of users is forwarded according to PON replication.

Step 42: The OLT sends the multicast join request message to a server.

Step 43: Establish the following forwarding table entry according to the forwarding relation determined in step 41:

P1→U21 (GEMPORT2), which indicates that the program P1 ordered by the user U21 is forwarded through the GEMPORT2 under the PON0, that is, the on-demand multicast program P1 is forwarded to the first user in the second type of users through the GEMPORT2 under the PON0 in a mode of user replication.

Step 44: A second user U22 in the second type of users requests the same program P1, and determines the forwarding mode as the forwarding according to user replication.

Step 45: Establish the following multicast table entry for the program P1 ordered by the U22:

P1→U22 (GEMPORT3), which indicates that the program P1 ordered by the second user in the second type of users is forwarded through the GEMPORT3 under the PON0, that is, the on-demand multicast program P1 is forwarded to the second user in the second type of users through the GEMPORT3 under the PON0 in the mode of user replication.

Step 46: A third user U23 in the second type of users sends a multicast join request message to the OLT through the ONT, where the multicast join request message includes the information about the multicast program P1 ordered by the U23, such as the identifier of the P1.

After receiving the multicast join request message from the third user in the second type of users, the OLT determines that the number of this type of users is greater than the preset threshold 2.

After receiving the multicast join request message from the third user in the second type of users, the OLT acquires the number of the second type of users ordering the same program P1, where the number now is 3 and is greater than the threshold 2. The forwarding relation data includes a relation data element indicating that the number of the same type of users ordering the same program, which is greater than the threshold, corresponds to the forwarding according to user replication. According to the number and the forwarding relation data, it is determined that for all of the second type of users U21, U22 and U23 ordering the program P1, the forwarding modes are the forwarding according to PON replication.

Step 47: Establish the following forwarding table entry according to the forwarding mode determined in step 46:

P1→PON0 (GEMPORT1), which indicates that the program P1 ordered by the second type of users is forwarded through the GEMPORT1 under the PON0, that is, the on-demand multicast program P1 is forwarded to all of the second type of users ordering the program P1 through the GEMPORT1 under the PON0 in a mode of PON replication.

Step 48: The server provides the multicast program P1 to the OLT.

Step 49: The OLT forwards the multicast program P1 to the second type of users U21, U22 and U23 according to the established forwarding table entries.

When the OLT detects that the number of the second type of users ordering the P1 is smaller than the preset threshold 2, the OLT will further set the current forwarding mode of the on-demand P1 as a mode of forwarding according to user replication.

Figure 7:
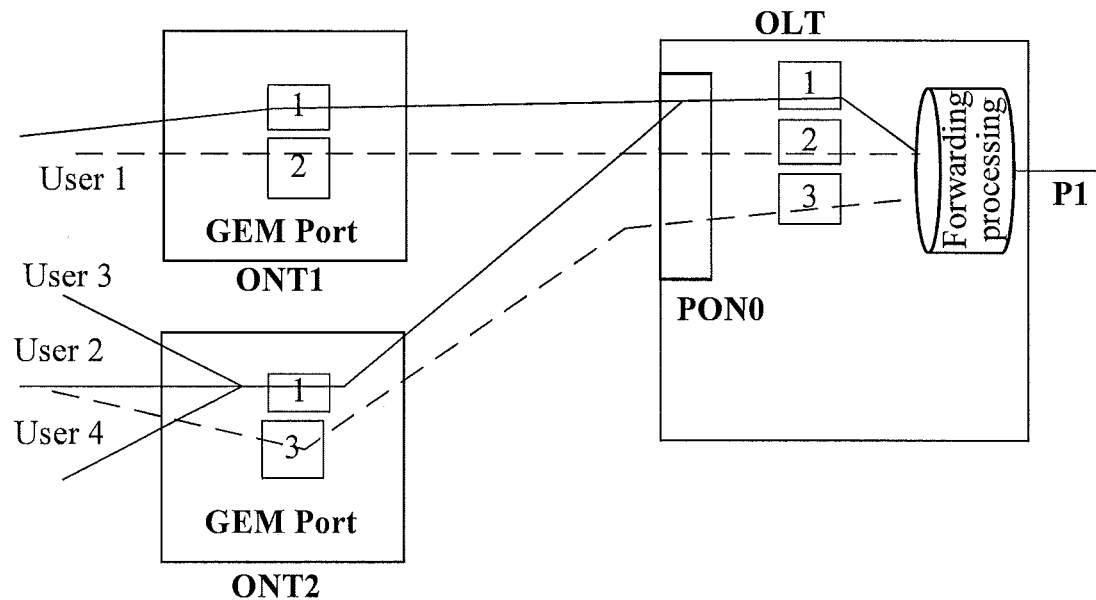
FIG. 7 is a schematic diagram of forwarding a multicast program according to Embodiment 4 of the present invention.

As shown in FIG. 7, it is a schematic diagram of forwarding a multicast program in this embodiment. Taking GPON as an example, the PON0 of the OLT is connected to two ONTs. The user under the ONT1 is User 1, while the users under the ONT2 are User 2, User 3 and User 4; and the users all order the program P1 and all belong to the second type of users. It can be seen from FIG. 7 that, for the User 1 and User 2, when ordering the multicast program P1, the forwarding modes are both configured as the forwarding according to user replication (indicated by dotted lines in the figure), and multicast program data is replicated on the GEMPORTs corresponding to the users, respectively. For example, for the User 1, the multicast program data is replicated on the corresponding GEMPORT2; while for the User 2, the multicast program data is replicated on the GEMPORT3. After the User 3 also orders the multicast program P1, for the User 1, User 2 and User 3, the forwarding modes are all configured as a mode of forwarding according to PON replication; and when a fourth user exists, the forwarding mode is also configured as the mode of forwarding according to PON replication (indicated by solid lines in the figure).

In this embodiment, for the users with different forwarding requirements, the embodiment of the present invention may flexibly select the corresponding forwarding modes for the multicast programs ordered by the users. Therefore, by using the method for forwarding the multicast program according to the embodiment of the present invention, the flexibility of forwarding the multicast programs is improved. In addition, in this embodiment, when the second type of users are ordering the multicast program P1, different forwarding modes may be configured according to the number of the second type of users, thereby reducing the total forwarding bandwidth of the system.

Figure 8:
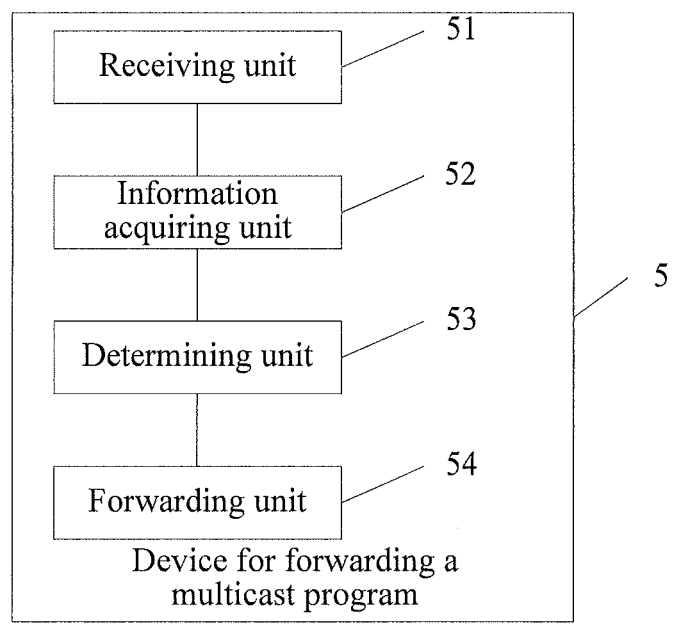
FIG. 8 is a schematic diagram of an apparatus for forwarding a multicast program according to Embodiment 5 of the present invention.

As shown in FIG. 8, a device 5 for forwarding a multicast program according to Embodiment 5 of the present invention includes:

a receiving unit 51, configured to receive a multicast join request message requesting an on-demand program from a user;

an information acquiring unit 52, configured to obtain forwarding decision information according to the multicast join request message;

a determining unit 53, configured to determine a decision result corresponding to the forwarding decision information according to the forwarding decision information and forwarding relation data, where the decision result is forwarding according to PON replication or forwarding according to user replication, the forwarding relation data includes data elements indicating correspondence between various types of forwarding decision information and various types of forwarding modes, and the various types of forwarding modes include the forwarding according to PON replication and the forwarding according to user replication; and a forwarding unit 54, configured to forward the on-demand program to the user according to the decision result.

For the meanings of the data elements indicating the correspondence between the various types of forwarding decision information and the various types of forwarding modes, reference may be made to the descriptions in the foregoing method embodiments, and the details are not described here again.

Figure 9:
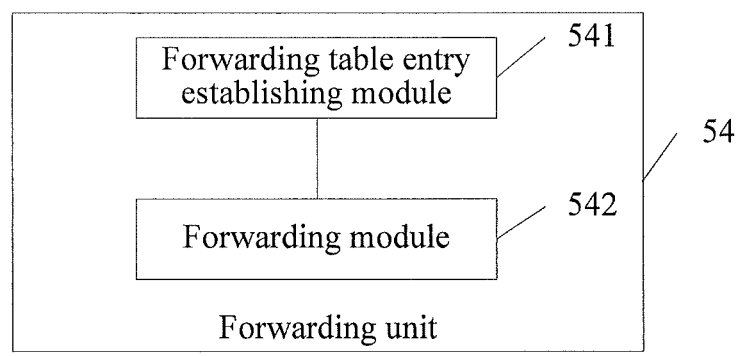
FIG. 9 is a schematic diagram of a forwarding unit in Embodiment 5 of the present invention.

Furthermore, as shown in FIG. 9, the forwarding unit 54 in FIG. 8 may include:

a forwarding table entry establishing module 541, configured to establish forwarding table entries for the multicast program in a forwarding table according to the decision result; and a forwarding module 542, configured to acquire the multicast program, look up the forwarding table, and forward the multicast program to the user according to the forwarding table entries. The forwarding table entries include the multicast program and a forwarding port; and the forwarding port is a port for forwarding according to PON replication or a port for forwarding according to user replication.

The apparatus for forwarding a multicast program shown in FIG. 8 may be located in an OLT.

In this embodiment, the forwarding relation data includes the data elements indicating the correspondence between the various types of forwarding decision information and the various types of forwarding modes, and the various types of forwarding modes include the forwarding according to PON replication and the forwarding according to user replication. Therefore, for users with different forwarding requirements, the embodiment of the present invention may select the corresponding forwarding modes flexibly according to different multicast programs. In this manner, by using the device for forwarding the multicast program according to the embodiment of the present invention, the flexibility of forwarding the multicast programs is improved.

Figure 10:
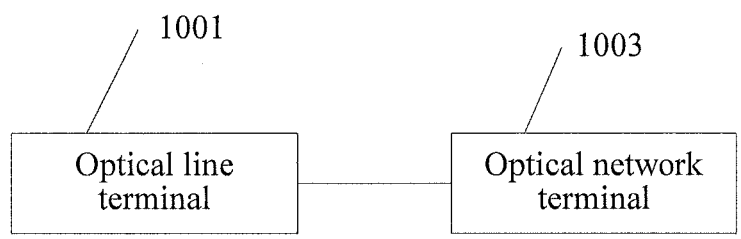
FIG. 10 is a schematic diagram of a system for forwarding a multicast program according to Embodiment 6 of the present invention.

As shown in FIG. 10, Embodiment 6 of the present invention further provides a multicast system, which includes:

an optical network terminal 1001 and an optical line terminal 1003, where the optical network terminal 1001 sends a multicast join request message requesting an on-demand program from a user to the optical line terminal 1003; and the optical line terminal 1003 receives the multicast join request message, obtains forwarding decision information according to the multicast join request message, determines a decision result corresponding to the forwarding decision information according to the forwarding decision information and forwarding relation data, where the decision result is forwarding according to PON replication or forwarding according to user replication, the forwarding relation data includes data elements indicating correspondence between various types of forwarding decision information and various types of forwarding modes, and the various types of forwarding modes include the forwarding according to PON replication and the forwarding according to user replication, and forwards the on-demand program to the optical network terminal according to the decision result.

Persons of ordinary skill in the art should understand that, all or a part of processes in the method according to the embodiments may be accomplished by relevant hardware under instructions of a computer program. The program may be stored in a computer-readable storage medium. When the program is run, the process of the method according to the embodiments of the present invention is performed. The storage medium may be a magnetic disk, an optical disk, a read-only memory (Read-Only Memory, ROM), or a random access memory (Random Access Memory, RAM).

The above description is merely exemplary embodiments of the present invention, and is not intended to limit the protection scope of the present invention. Various modifications and replacements that can be easily thought of by persons skilled in the art without departing from the technical scope of the present invention should be considered falling within the protection scope of the present invention. Therefore, the protection scope of the present invention is subject to the appended claims.

What is claimed is:

1. A method for forwarding a multicast program, comprising:
   receiving, by an Optical Line Terminal (OLT), a multicast join request message from a user for requesting an on-demand program;
   obtaining, by the OLT, forwarding decision information according to the multicast join request message;
   acquire, by the OLT, a decision result by searching data elements with the obtained forwarding decision information; wherein the data elements indicate a correspondence between various types of forwarding decision information and various types of forwarding modes; wherein the various types of forwarding modes comprise a forwarding according to Passive Optical Network (PON) replication and a forwarding according to user replication; wherein the decision result is the forwarding according to PON replication or the forwarding according to user replication; and
   forwarding, by the OLT, the on-demand program to the user according to the decision result.

2. The method according to claim 1, wherein the data elements indicating the correspondence between the various types of forwarding decision information and the various types of forwarding modes comprise:
   data elements indicating correspondence between various user types and the various types of forwarding modes; or,
   data elements indicating correspondence between various security levels of on-demand programs and the various types of forwarding modes; or,
   data elements indicating correspondence between various combinations of the various user types and the various security levels of on-demand programs and the various types of forwarding modes; or,
   data elements indicating correspondence between the number of a same type of users ordering a same program and the various types of forwarding modes.

3. The method according to claim 1, wherein the data elements indicating the correspondence between the various types of forwarding decision information and the various types of forwarding modes comprise:
   at least one data element indicating that the forwarding mode is the forwarding according to PON replication, and at least one data element indicating that the forwarding mode is the forwarding according to user replication.

4. The method according to claim 2, wherein the data elements indicating the correspondence between the various user types and the various types of forwarding modes comprise:
   a data element indicating that a user type of not subscribing to a multicast service corresponds to the forwarding according to user replication.

5. The method according to claim 2, wherein the data elements indicating the correspondence between the various security levels of on-demand programs and the various types of forwarding modes comprise:
   a data element indicating that a security level higher than a preset security level corresponds to the forwarding according to user replication.

6. The method according to claim 2, wherein the data elements indicating the correspondence between the various combinations of the various user types and the various security levels of on-demand programs and the various types of forwarding modes comprise:
   a data element indicating that a security level of the on-demand program higher than a preset security level and a user type being a user subscribing to a multicast service correspond to the forwarding according to user replication;
   a data element indicating that the security level of the on-demand program higher than the preset security level and the user type being a user not subscribing to a multicast service correspond to the forwarding according to user replication;
   a data element indicating that the security level of the on-demand program lower than the preset security level and the user type being a user not subscribing to a multicast service correspond to the forwarding according to user replication; and
   a data element indicating that the security level of the on-demand program lower than the preset security level and the user type being a user subscribing to a multicast service correspond to the forwarding according to PON replication.

7. The method according to claim 2, wherein the data elements indicating the correspondence between the number of the same type of users ordering the same program and the various types of forwarding modes comprise:
   a data element indicating that the number smaller than or equal to a threshold corresponds to the forwarding according to user replication; and
   a data element indicating that the number greater than the threshold corresponds to the forwarding according to PON replication.

8. The method according to claim 1, wherein the forwarding the multicast program to the user according to the decision result comprises:
   establishing forwarding table entries for the multicast program in a forwarding table according to the decision result; and
   acquiring the multicast program, looking up the forwarding table, and forwarding the multicast program to the user according to the forwarding table entries.

9. The method according to claim 8, wherein the forwarding table entries comprise the multicast program and a forwarding port; and the forwarding port is a port for forwarding according to PON replication or a port for forwarding according to user replication.

10. An apparatus for forwarding a multicast program, comprising:
    a receiving unit, configured to receive a multicast join request message from a user for requesting an on-demand program;
    an information acquiring unit, configured to obtain forwarding decision information according to the multicast join request message;
    a determining unit, configured to acquire a decision result by searching data elements with the obtained forwarding decision information; wherein the data elements indicate a correspondence between various types of forwarding decision information and various types of forwarding modes; wherein the various types of forwarding modes comprise a forwarding according to Passive Optical Network, PON, replication and a forwarding according to user replication; wherein the decision result is the forwarding according to PON replication or the forwarding according to user replication; and a forwarding unit, configured to forward the on-demand program to the user according to the decision result.

11. The apparatus according to claim 10, wherein the forwarding unit comprises:

a forwarding table entry establishing module, configured to establish forwarding table entries for the multicast program in a forwarding table according to the decision result; and a forwarding module, configured to acquire the multicast program, look up the forwarding table, and forward the multicast program to the user according to the forwarding table entries.

12. A system for forwarding a multicast program, comprising: an optical network terminal and an optical line terminal, wherein the optical network terminal is configured to send a multicast join request message requesting an on-demand program from a user to the optical line terminal; and the optical line terminal is configured to receive the multicast join request message, obtains forwarding decision information according to the multicast join request message, determines a decision result corresponding to the forwarding decision information according to the forwarding decision information and forwarding relation data, wherein the decision result is forwarding according to PON replication or forwarding according to user replication, the forwarding relation data comprises data elements indicating correspondence between various types of forwarding decision information and various types of forwarding modes, and the various types of forwarding modes comprise the forwarding according to PON replication and the forwarding according to user replication, and forwards the on-demand program to the optical network terminal according to the decision result.

\* \* \* \* \*